(12) United States Patent
Song et al.

(10) Patent No.: US 12,117,124 B2
(45) Date of Patent: Oct. 15, 2024

(54) MULTIPLE STORAGE TANK SYSTEM

(71) Applicant: HYLIUM INDUSTRIES, INC., Seongnam-si (KR)

(72) Inventors: Soo Yong Song, Wonju-si (KR); Joshua Schimpf Kim, Osan-si (KR); Seo Young Kim, Yongin-si (KR)

(73) Assignee: HYLIUM INDUSTRIES, INC., Seongnam-si (KR)

( * ) Notice: Subject to any disclaimer, the term of this patent is extended or adjusted under 35 U.S.C. 154(b) by 339 days.

(21) Appl. No.: 17/706,616

(22) Filed: Mar. 29, 2022

(65) Prior Publication Data

US 2022/0333738 A1 Oct. 20, 2022

(30) Foreign Application Priority Data

Apr. 19, 2021 (KR) .................... 10-2021-0050602
Mar. 11, 2022 (KR) .................... 10-2022-0030932

(51) Int. Cl.
*F17C 1/00* (2006.01)
*B60K 15/03* (2006.01)

(52) U.S. Cl.
CPC ........ *F17C 1/005* (2013.01); *B60K 15/03006* (2013.01); *B60K 2015/03118* (2013.01); *B60K 2015/03144* (2013.01); *F17C 2205/0134* (2013.01); *F17C 2205/0323* (2013.01); *F17C 2221/012* (2013.01); *F17C 2227/0374* (2013.01); *F17C 2227/04* (2013.01); *F17C 2250/043* (2013.01)

(58) Field of Classification Search
CPC .............. F17C 1/005; F17C 2205/0134; F17C 2205/0323; F17C 2221/012; F17C 2227/0374; F17C 2227/04; F17C 2250/043; B60K 2015/03118
See application file for complete search history.

(56) References Cited

U.S. PATENT DOCUMENTS

| 11,073,245 | B2* | 7/2021 | Bernhardt | .............. F25J 1/0271 |
| 11,231,144 | B2* | 1/2022 | Lose | .................... F17C 13/026 |
| 2018/0313496 | A1 | 11/2018 | Garner et al. | |
| 2019/0331299 | A1* | 10/2019 | Lose | ........................ F17C 5/06 |

FOREIGN PATENT DOCUMENTS

| KR | 10-2039573 | 11/2019 |
| WO | 2020/074802 | 4/2020 |

* cited by examiner

*Primary Examiner* — Eric Keasel
(74) *Attorney, Agent, or Firm* — PnK IP LLC

(57) ABSTRACT

A multiple storage tank system includes: storage tanks in which cryogenic fluid is stored; discharge lines connected to the storage tanks to discharge the stored cryogenic fluid or introduce cryogenic fluid; a supply line connected to the discharge lines and a supply target to supply the discharged cryogenic fluid to the supply target; a build-up line branching off the supply line to control internal pressure of a first storage tank of the storage tanks; and a gas transfer line connected to the storage tanks to transfer gas inside the storage tanks, wherein when the internal pressure of the first storage tank is controlled while the cryogenic fluid passes through the build-up line, gas inside the first storage tank is transferred to at least one other storage tank through the gas transfer line so that internal pressure of the at least one other storage tank is controlled.

6 Claims, 3 Drawing Sheets

MULTIPLE STORAGE TANK SYSTEM

CROSS REFERENCE TO RELATED APPLICATION

This application claims priority from and the benefit of Korean Patent Application No. 10-2021-0050602, filed on Apr. 19, 2021, and Korean Patent Application No. 2022-0030932, filed on Mar. 11, 2022, which are hereby incorporated by reference for all purposes as if fully set forth herein.

BACKGROUND OF THE INVENTION

Field of the Invention

The present invention relates to a multiple storage tank system and, more specifically, to a multiple storage tank system, which has a plurality of storage tanks storing a cryogenic fluid, can control internal pressure of the plurality of storage tanks just by one pressure control device, namely, a device for controlling pressure inside the plurality of storage tanks, and can charge all of the storage tanks even if a charging line for charging a cryogenic fluid is connected to just one storage tank among the plurality of storage tanks, thereby efficiently storing a large amount of cryogenic fluid in a limited space.

Discussion of the Background

The above information disclosed in this Background section is only for understanding of the background of the inventive concepts, and, therefore, it may contain information that does not constitute prior art.

BACKGROUND ART

Many types of apparatuses store and use high-pressure gas as fuel, like liquefied petroleum gas (LPG) vehicles using LPG as fuel.

Moreover, because energy problems caused by the use of fossil fuel are getting serious, studies on alternative fuel are being actively carried out.

A technical idea of using hydrogen as fuel is in the spotlight as an alternative fuel since it is eco-friendly, has high efficiency, and has a wide utilization range such as in hydrogen vehicles that use hydrogen as fuel, flight vehicles such as drones, or other transportation devices.

A high-pressure hydrogen gas storage system, which stores hydrogen in a gas state and uses hydrogen as fuel, deteriorates over time and thereby has stability problems since it has a relatively low storage efficiency and a high risk of explosion.

When gaseous hydrogen is liquefied, the liquefied hydrogen can have a volume energy density of about 800 times at the same pressure compared to the gaseous hydrogen since the volume of the liquefied hydrogen is reduced by about $1/800$ compared to the gaseous hydrogen. Furthermore, the liquefied hydrogen compared to the gaseous hydrogen can remarkably reduce the risk of explosion and provide excellent stability since the liquefied hydrogen can be stored at atmospheric pressure and can be also stored at relatively low temperature.

As described above, not only the liquefied hydrogen in which hydrogen is liquefied but also a cryogenic fluid (e.g., liquefied nitrogen, liquefied helium, etc.) in which various kinds of gases are liquefied are gradually widened in a range of use.

A cryogenic fluid generally has a high energy storage density per unit volume and weight, and can be immediately utilized through simple vaporization without any additional process for utilizing as fuel. Therefore, compared to a case in which the high-pressure gas storage system using the existing gas as fuel is applied to a vehicle, an aircraft, a ship, etc., it is desirable to greatly improve a driving distance even in a same storage space when a cryogenic fluid in which gas is liquefied is used.

As described above, in the case that the cryogenic fluid in which gas is liquefied is stored, in order to discharge the stored cryogenic fluid from the storage tank to supply the cryogenic fluid to a predetermined object, for instance, a fuel cell, a vehicle, a drone, or the like, a pressure control device for controlling pressure inside the storage tank and an installation space for the pressure control device is also required, differently from the storage system storing the existing gas as it is.

Therefore, in order to apply cryogenic fluid in which gas is liquefied to devices that store and use the existing gas, it is necessary to change a design of a frame or to reduce storage capacity, that is, storage tank capacity.

This is especially the case for a storage system that includes a plurality of storage tanks, which has a disadvantage of being limited in an installation space since the plurality of storage tanks respectively require pressure control devices corresponding to the storage tanks.

Two or more storage tanks may be used to improve long-distance driving capability of a transportation device by storing higher amounts of fuel (cryogenic fluid) by utilizing the available installation space in a transportation device, such as a vehicle or a drone. As described above, the storage tanks in which cryogenic fluid is stored have a limitation in space utilization since a pressure control device is required for each storage tank.

In other words, for a conventional multiple storage tank system storing a cryogenic fluid, it is difficult to secure an installation space since the same number of pressure control devices as the storage tanks is required, and there is a limitation in capacity of the storage tanks in which the cryogenic fluid is stored as fuel since an additional installation space is required for the pressure control devices when they are installed with the storage tanks in the installation space.

In addition, in the case that a plurality of storage tanks are mounted, it is very inefficient to individually charge each of the storage tanks at the time of charging the cryogenic fluid.

SUMMARY

Accordingly, inventive concepts consistent with one or more embodiments are directed to solve the above-mentioned problems, by providing a multiple storage tank system in which a plurality of storage tanks are applied to one pressure control device to use the plurality of storage tanks even in a limited installation space, thereby controlling pressure in at least one other storage tank of the plurality of storage tanks when one storage tank having the pressure control device is controlled in pressure.

One or more inventive concepts consistent with one or more embodiments enable a plurality of storage tanks to share one pressure control device, thereby securing more cryogenic fluid storage space for a vehicle, a ship, a drone, etc.

One or more inventive concepts consistent with one or more embodiments are operative to improve user convenience by charging all of a plurality of storage tanks even if only one storage tank among the plurality of storage tanks is charged.

Inventive concepts consistent with one or more embodiments provide for a multiple storage tank system that can transfer a cryogenic fluid to the plurality of storage tanks connected when the cryogenic fluid is filled in one storage tank.

Additional features of the inventive concepts will be set forth in the description that follows, and in part will be apparent from the description, or may be learned by practice of the inventive concepts.

According to an embodiment, there is provided a multiple storage tank system that includes: a plurality of storage tanks in which a cryogenic fluid is stored; a plurality of discharge lines respectively connected to the plurality of storage tanks to discharge the stored cryogenic fluid or introduce a cryogenic fluid; a supply line connected to the plurality of discharge lines and a supply target to supply the cryogenic fluid discharged from the plurality of discharge lines to the supply target; a build-up line branching off at a predetermined position of the supply line to control internal pressure of a first storage tank of the plurality of storage tanks; and a gas transfer line connected to the plurality of storage tanks to transfer gas inside the plurality of storage tanks, wherein when the internal pressure of the first storage tank is controlled while the cryogenic fluid passes through the build-up line, gas inside the first storage tank is transferred to at least one other storage tank of the plurality of storage tanks through the gas transfer line so that internal pressure of the other storage tanks is also controlled.

Moreover, the build-up line may have one end branching off from a first point and the other end connected to the supply line at a second point after a portion of the build-up line passes the cryogenic fluid in the first storage tank. The multiple storage tank system may further include: a first heat exchanger formed at a position in front of the first point where the build-up line branches off from the supply line; and a second heat exchanger formed at a second point before the other end of the build-up line is connected to the supply line.

Furthermore, the multiple storage tank system may further include: a first valve provided in the build-up line after the first point to selectively move the cryogenic fluid to the supply line or the build-up line; and a second valve formed at a position in front of the second point after the first point in the supply line, wherein the first valve is opened and the second valve is closed so that the cryogenic fluid passes through the build-up line when the internal pressure of the storage tank is less than preset pressure, or the first valve is closed and the second valve is opened so that the cryogenic fluid passes through the supply line when the internal pressure of the storage tank exceeds the preset pressure.

Additionally, the multiple storage tank system may further include: a charging line for charging a first storage tank among the plurality of storage tanks with the cryogenic fluid; and a third valve formed at a predetermined position of the supply line. The supply line comprises a first section connecting the discharge lines on the basis of the third valve and a second section connected from the first section to the supply target. When the first storage tank is charged with the cryogenic fluid through the charging line, the third valve is closed so that the cryogenic fluid discharged through the discharge line formed in the first storage tank is transferred only in the first section and the other storage tanks are also charged through the other discharge lines connected to the first section.

According to another embodiment, there is provided a multiple storage tank system that includes: a plurality of storage tanks in which a cryogenic fluid is stored; a plurality of discharge lines respectively connected to the plurality of storage tanks to discharge the stored cryogenic fluid or introduce a cryogenic fluid; a supply line connected to the plurality of discharge lines and a supply target to supply the cryogenic fluid discharged from the plurality of discharge lines to the supply target; a charging line connected to a first storage tank of the plurality of storage tanks to charge the first storage tank with the cryogenic fluid; and a valve formed on the supply line. The supply line includes a first section connecting the discharge lines on the basis of the valve and a second section connected from the first section to the supply target. When the first storage tank is charged with the cryogenic fluid through the charging line, the valve is closed so that the cryogenic fluid discharged through a first discharge line formed in the first storage tank is transferred only in the first section and at least one other storage tank of the plurality of storage tanks is also charged through the other discharge lines connected to the first section.

According to one or more embodiments, a multiple storage tank system can control pressure in more than one of the connected storage tanks when one storage tank having the pressure control device is controlled in pressure, since a plurality of storage tanks are applied to one pressure control device to use the plurality of storage tanks even in a limited space.

Additionally, the multiple storage tank system according to one or more embodiments can transfer a cryogenic fluid to the plurality of storage tanks connected when the cryogenic fluid is filled in one storage tank.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

The above and other objects, features and advantages of the present invention will be apparent from the following detailed description of the preferred embodiments of the invention in conjunction with the accompanying drawings, in which.

DETAILED DESCRIPTION

Figure 1:
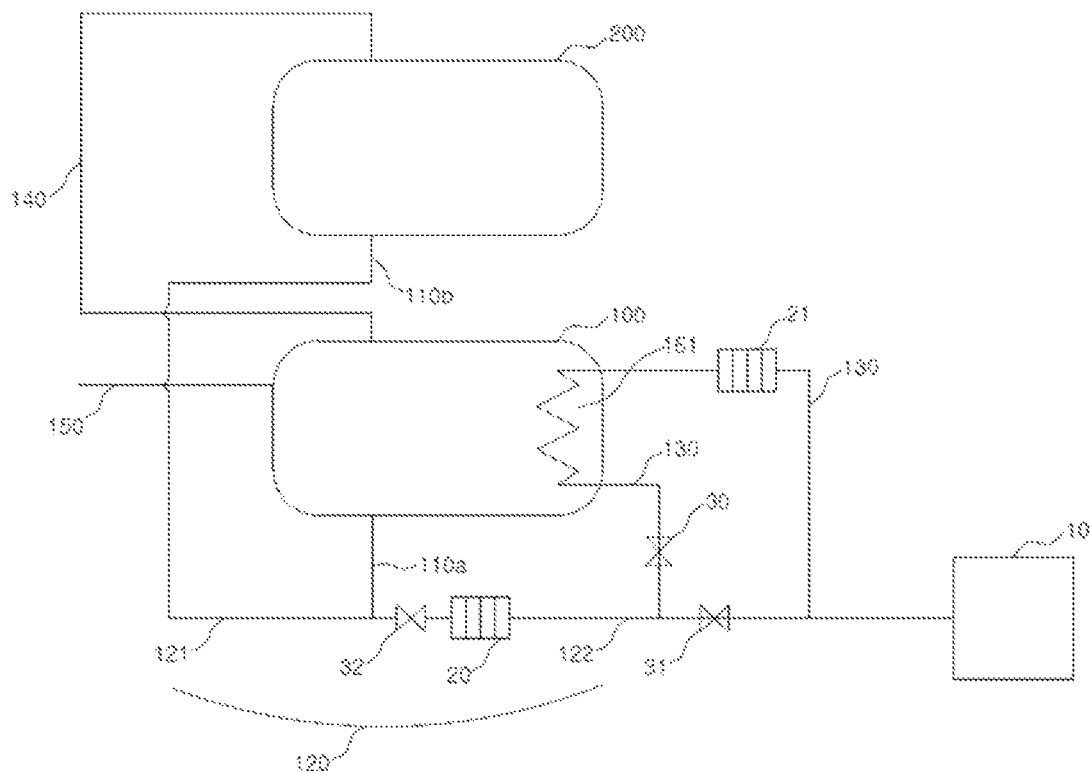
FIG. 1 is a schematic diagram illustrating a configuration of a multiple storage tank system according to an embodiment that is constructed according to principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described with reference to the attached drawings. Like reference numerals in the drawings denote like elements.

Existing systems have been used by installing pressure control devices respectively corresponding to storage tanks. However, the existing systems have a limitation in using a transportation device, such as a small vehicle or the like, that has a spatial constraint.

Embodiments described herein use one pressure control device even when a plurality of storage tanks are used, but can provide the same effect as using a plurality of pressure control devices.

Figure 2:
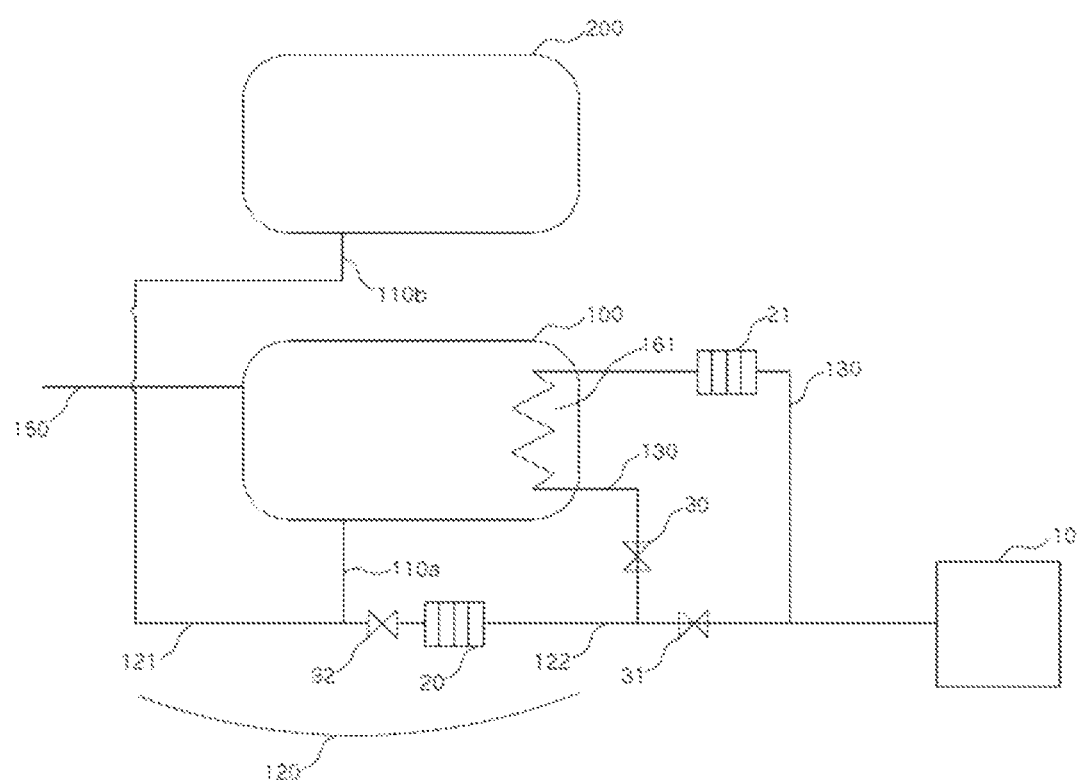
FIG. 2 is a schematic diagram illustrating a configuration of a multiple storage tank system according to another embodiment.

FIG. 1 is a schematic diagram illustrating a configuration of a multiple storage tank system according to an embodiment that is constructed according to principles of the invention, and FIG. 2 is a schematic diagram illustrating a configuration of a multiple storage tank system according to another embodiment.

Referring to FIG. 1, a multiple storage tank system 1 according to an embodiment includes: a plurality of storage tanks 100 and 200 in which cryogenic fluid is stored; a plurality of discharge lines 110a and 110b respectively connected to the plurality of storage tanks 100 and 200 to discharge the stored cryogenic fluid or introduce a cryogenic fluid; a supply line 120 connected to the other end of each of the plurality of discharge lines 110a and 110b to transfer the cryogenic fluid discharged from the plurality of discharge lines 110a and 110b to supply the cryogenic fluid to a supply target 10; a build-up line 130 connected to the supply line 120 and formed to pass through the inside of a first storage tank 100, which is any one of the plurality of storage tanks 100 and 200, to control the internal pressure of the first storage tank 100; and/or a gas transfer line 140 connected to the plurality of storage tanks 100 and 200 to transfer gas inside the plurality of storage tanks 100 and 200. According to an embodiment, the multiple storage tank system 1 may further include a charging line 150 for charging any one storage tank 100 or 200 among the plurality of storage tanks 100 and 200 with a cryogenic fluid.

On the other hand, the supply target 10 can be any object requiring supply or charging of the fluid stored in the plurality of storage tanks 100 and 200.

In an embodiment, when the cryogenic fluid stored in the plurality of storage tanks 100 and 200 is liquefied hydrogen, the supply target 10 may be a hydrogen vehicle directly using hydrogen as fuel or a fuel cell using hydrogen as fuel. Of course, when the cryogenic fluid is not the liquefied hydrogen but a fluid of other types, objects requiring charging of the corresponding cryogenic fluid may be the supply target 10. Hereinafter, in the embodiments described herein, a case where the cryogenic fluid is liquefied hydrogen and the supply object 10 is a hydrogen vehicle or a fuel cell requiring charging or supply of hydrogen will be described, but the embodiments described herein are not limited thereto.

Moreover, the cryogenic fluid stored in the plurality of storage tanks 100 and 200 may be a liquefied gas. Hereinafter, it will be described that the cryogenic fluid is liquefied hydrogen in which hydrogen is liquefied, but the embodiments are not limited thereto. The cryogenic fluid can denote not only hydrogen but also various kinds of gases, such as liquefied nitrogen, liquefied helium, liquefied natural gas, and the like, which are liquefied. It would be easily deduced to those skilled in the art that the embodiments described herein may be applied regardless of the types of the cryogenic fluid stored in the plurality of storage tanks 100 and 200.

Furthermore, each of the plurality of storage tanks 100 and 200 may include an inner tank in which the cryogenic fluid is stored, and an outer tank spaced apart from the inner tank at a predetermined distance to surround the inner tank.

According to an embodiment, the storage tank may be a single tank, or it may be physically discriminate the inner tank and the outer tank from each other. Even in such a case, the embodiments described herein can be applied in the same manner.

In addition, in the drawings, it is illustrated that the multiple storage tank system is a double-tank system having two storage tanks 100 and 200, but the embodiments are not limited thereto. According to embodiments, even in the case that the multiple storage tank system has three storage tanks or more, the t embodiments described herein can be applied in the same manner.

Furthermore, in embodiments, the discharge lines 110a and 110b and the supply line 120 are partial sections of a line which connects the storages tanks 100 and 200 to the supply target 10 for convenience of explanation, and does not denote separate lines divided physically.

For instance, the discharge lines 110a and 110b can denote a predetermined section from the connected storage tanks, and the supply line 120 can denote a remaining section connected from the predetermined section to the supply target 10. Of course, according to embodiments, the discharge lines 110a and 110b and the supply line 120 may be formed in separate lines to be connected to each other.

According to the embodiments described herein, even when pressure control is performed through the build-up line 130 only in one storage tank 100 or 200 of the plurality of storage tanks 100 and 200, the pressure of the remaining storage tanks 200 is also controlled. Additionally, even when only one storage tank 100 or 200 is charged with the cryogenic fluid, the remaining storage tanks 200 are also charged with the cryogenic fluid.

FIGS. 1 and 2 illustrate that the build-up line 130 and the charging line 150 are included in one storage tank, for example, are included in a first storage tank 100, but the embodiments are not limited thereto.

For example, the multiple storage tank system 1 may be formed such that the build-up line 130 is provided in the first storage tank 100 of the plurality of storage tanks 100 and 200 and the charging line 150 is provided in the second storage tank 200.

In any case, according to the embodiments described herein, the build-up line 130 and/or the charging line 150 are not individually provided for each of the plurality of storage tanks 100 and 200 included in the multiple storage tank system 1 but are provided in any one storage tank so that pressure control or charging of the cryogenic fluid can be performed to the other storage tanks.

The build-up line 130 branches off from the supply line 120, and a part of the build-up line 130 can be formed to pass the cryogenic fluid stored in the first storage tank 100.

In general, in order to smoothly discharge the cryogenic fluid stored in the storage tank storing the cryogenic fluid, the storage tank needs to maintain the internal pressure at a predetermined level or more. The build-up line 130 is to facilitate smooth discharge of the cryogenic fluid stored in the storage tank, for instance, the first storage tank 100, by rising the internal pressure of the first storage tank 100. When the cryogenic fluid transferred along the supply line 120 passes through the build-up line 130, the cryogenic fluid with relatively higher temperature increases temperature of the cryogenic fluid stored in the first storage tank 100, thereby facilitating vaporization in the first storage tank 100 and rising the internal pressure by the vaporized gas in the first storage tank 100.

As described above, the amount of gas in the first storage tank 100 is increased through the build-up line 130 such that the internal pressure of the first storage tank 100 is increased. In this instance, the gas in the first storage tank 100 is transferred to the remaining storage tanks 200 through the gas transfer line 140, and the internal pressure of the other storages tanks 200 to which the build-up line 130 is not connected can be also controlled.

According to an embodiment, the transfer of gas through the gas transfer line 140 can be performed when the internal pressure of the first storage tank 100 is greater than or equal to a predetermined level. That is, when the internal pressure of the first storage tank 100 rises while the cryogenic fluid passes through the build-up line 130 until the internal pressure reaches a predetermined level, the internal gas of the first storage tank 100 can be transferred to the remaining storage tanks 200 through the gas transfer line 140. A predetermined valve may be provided in the gas transfer line 140 for this purpose.

In one example, the build-up line 130 may be formed such that one end thereof branches off from a first point, which is a predetermined position of the supply line 120, and the other end is connected to a second point of the supply line 120 after a portion of the build-up line 130 passes the cryogenic fluid in the first storage tank 100 of the plurality of storage tanks 100 and 200. In this instance, the second point may be located behind the first point on the supply line 120. For example, the second point may be located closer to the supply target 10 than the first point.

Moreover, a first heat exchanger 20 may be provided on the supply line 120 to vaporize the discharged cryogenic fluid or increase the temperature of the discharged cryogenic fluid at a point after the cryogenic fluid is discharged from the plurality of storage tanks 100 and 200 through the discharge lines 110a and 110b.

The first heat exchanger 20 on the supply line 120 may be positioned between a connection point of one of the discharge lines 110a or 110b (in case of FIG. 1, line 110a) and a point where the build-up line 130 is branched.

For example, the first heat exchanger 20 can be formed at a position where the temperature of the cryogenic fluid discharged from the plurality of storage tanks 100 and 200 through the discharge lines 110a and 110b is increased, and the cryogenic fluid having the increased temperature can be directly supplied to the supply target 10 or can be supplied to the supply target 10 via the build-up line 130.

According to an embodiment, the build-up line 130 may be provided with a second heat exchanger 21 for increasing the temperature of the cryogenic fluid being transferred.

As described above, when the cryogenic fluid passes through the build-up line 130 after passing through the first heat exchanger 20, the cryogenic fluid exchanges heat with the cryogenic fluid stored in the first storage tank 100 passing through the build-up line 130 so that the temperature of the cryogenic fluid transferred in the build-up line 130 get lower again.

Therefore, in order to increase the temperature of the cryogenic fluid passing through the build-up line 130 again, the build-up line 130 includes the second heat exchanger 21 at a position in front of the second point where the build-up line 130 is connected to the supply line 120 again.

The cryogenic fluid discharged from the plurality of storage tanks 100 and 200 to be transferred through the supply line 120 can be selectively determined whether or not to pass the build-up line 130 as occasion demands.

The multiple storage tank system 1 may include valves, for example, a first valve 30, a second valve 31, and/or a third valve 32, for controlling the flow of the cryogenic fluid. According to an embodiment, the multiple storage tank system 1 may further include a control unit for controlling the operation of the valves, for example, the first valve 30, the second valve 31, and/or the third valve 32.

In this instance, the control unit can refer to a device or a system capable of opening or closing the valves and/or the lines so that the cryogenic fluid is transferred along a specific line or is not transferred to a specific section according to various preset conditions, such as internal pressure of the plurality of storage tanks 100 and 200 or a storage amount of the cryogenic fluid.

For instance, the valve may have a mechanical configuration capable of automatically operating when the internal pressure of at least one of the storage tanks 100 and 200 reaches a specific pressure so as to perform the function and the role of the control unit.

Alternatively, the control unit includes or communicates with a sensor for sensing the internal pressure of at least one of the plurality of storage tanks 100 and 200, and may have an electronic configuration for controlling the operation of the valves according to a pressure value sensed by the sensor. In this case, the control unit senses necessary information and includes components necessary for controlling the operation of the valves by using the sensed information. Since the technical idea related to a mechanical an or electronic valve is well known to those of ordinary skill in the art, and a detailed description of such a device is omitted for sake of brevity.

The first valve 30 and the second valve 31 may be configured to control whether or not the cryogenic fluid passes through the build-up line 130.

For example, when it is necessary to increase the internal pressure of the storage tanks 100 and 200 since the cryogenic fluid is not smoothly discharged from the plurality of storage tanks 100 and 200, the first valve 30 is opened and the second valve 31 is closed so that the cryogenic fluid, which has been transferred along the supply line 120, passes through the build-up line 130, thereby increasing the internal pressure of the storage tanks 100 and 200.

After that, when the internal pressure of the storage tanks 100 and 200 reaches a sufficient level, the first valve 30 is closed and the second valve 31 is opened, so that the cryogenic fluid can be directly supplied to the supply target 10 along the supply line 120 without passing through the build-up line 130.

The first valve 30 is disposed on the build-up line 130 at a position before the build-up line 130 heads to the inside of the first storage tank 100 after the build-up line 130 branches off from the supply line 120, and the second valve 31 is disposed on the supply line 120 at a position before the build-up line 130 is connected to the supply line 120 again after the build-up line 130 branches off from the supply line 120.

As illustrated in FIGS. 1 and 2, the third valve 32 is positioned in front of the first heat exchanger 20, namely, close to the storage tanks 100 and 200. Such a third valve 32 may be provided to charge the plurality of storage tanks 100 and 200 with the cryogenic fluid.

As described above, a charging line 150 for charging a cryogenic fluid can be connected to any one of the plurality of storage tanks 100 and 200. In the drawing, it is illustrated that the charging line 150 is connected to the first storage tank 100 through which the build-up line 130 passes, but it is not necessary that the charge line 150 and the build-up line 130 are all disposed in one storage tank, for example, the first storage tank 100, as described above. Hereinafter, for convenience of explanation, it will be described that the charging line 150 is also connected to the first storage tank 100.

When the first storage tank 100 is charged with the cryogenic fluid through the charging line 150, the discharge lines 110a and 110b respectively connected to the storage tanks 100 and 200 can maintain an opened state.

Then, the cryogenic fluid charged through the charging line 150 flows to the supply line 120 through the discharge line 110a of the first storage tank 100.

In this instance, the third valve 32 is closed to prevent the cryogenic fluid from flowing further toward the supply target 10.

For convenience of explanation, the supply line 120 is divided into a first section 121 and a second section 122 around the third valve 32.

The cryogenic fluid does not flow toward the second section 122 of the supply line 120 closed by the third valve 32. The cryogenic fluid charged through the charging line 150 passes the first section 121 of the supply line 120 from the discharge line 110a of the first storage tank 100, and is introduced to the inside of the remaining storage tanks 200 through the second discharge line 110*b* of the remaining storage tank 200.

That is, when charging is performed through the charging line 150, the multiple storage tank system 1 closes the third valve 32 in the state in which the discharge lines 110*a* and 110*b* of the storage tanks 100 and 200 are opened, so that the plurality of storage tanks 100 and 200 can share the cryogenic fluid charged through a partial section of the supply line 120, for instance, the first section 121.

According to an embodiment, as illustrated in FIG. 2, the multiple storage tank system 1 may be configured only to charge the plurality of storage tanks 100 and 200 with the cryogenic fluid regardless of whether or not there is the gas transfer line 140. FIG. 2 illustrates that the build-up line 130 passes through the first storage tank 100 among the plurality of storage tanks 100 and 200, but if there is no the gas transfer line 130, the storages tanks may respectively have the build-up lines 130. Alternatively, the multiple storage tank system 1 may include another device or another system for controlling the internal pressure of each of the storage tanks 100 and 200.

In any case, the multiple storage tank system 1 according to another embodiment can charge all of the storage tanks 100 and 200 with the cryogenic fluid even though the charging lines 150 are not respectively connected to the plurality of storage tanks 100 and 200 using the third valve 32 but the charging line 150 is connected only to one, namely, the first storage tank 100, among the storage tanks 100 and 200 to charge the storage tanks with the cryogenic fluid.

Finally, according to an embodiment, in the system including the plurality of storage tanks 100 and 200 for storing cryogenic fluid, even though only one storage tank is controlled in pressure, the other storage tanks are also controlled in pressure, and even though only one storage tank among the plurality of storage tanks 100 and 200 is charged with the cryogenic fluid, the other storage tanks are also charged with the cryogenic fluid. Therefore, the embodiments described herein may significantly improve space utilization efficiency, and may significantly reduce costs consumed with no need to construct additional charging lines and/or building lines according to the number of the storage tanks.

Figure 3:
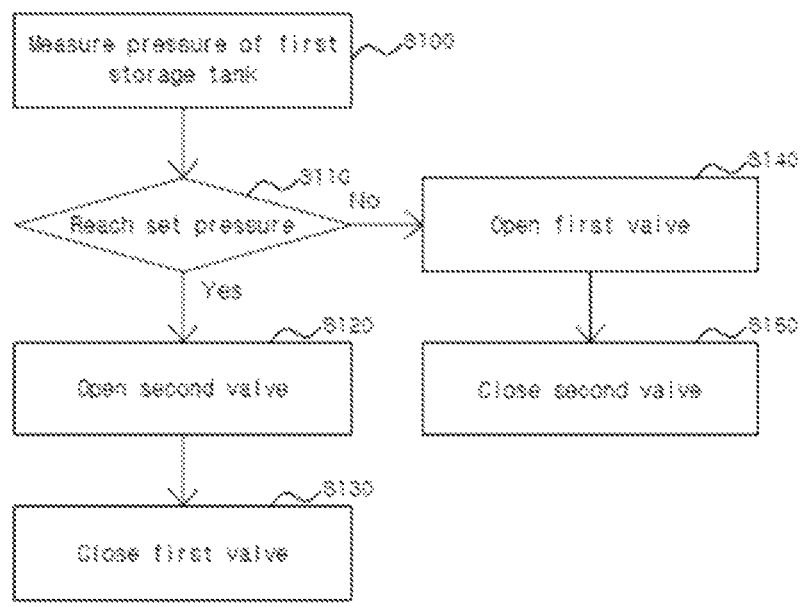
FIGS. 3 and 4 illustrate schematic flow charts of a method for controlling a valve of the multiple storage tank system according to an embodiment.
Figure 4:
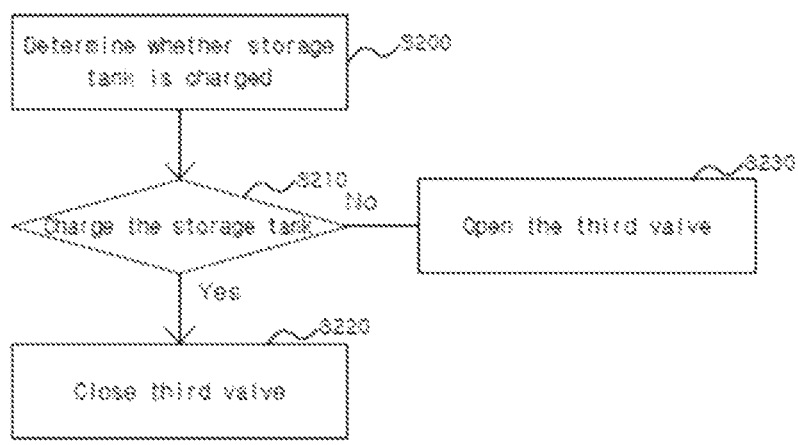

FIGS. 3 and 4 illustrate schematic flow charts of a method for controlling a valve of the multiple storage tank system according to the embodiment.

Referring to FIG. 3, the multiple storage tank system 1 measures pressure of the first storage tank 100 (S100), and determines whether a predetermined reference, for instance, set pressure of the first storage tank 100, is satisfied according to a measurement result in step (S100).

In the multiple storage tank system 1, when the pressure of the first storage tank reaches or exceeds the set pressure as the measurement result in step (S100), the control unit opens the second valve 31 (S120) and closes the first valve 30 (S130) to stop the cryogenic fluid through the build-up line 130 and to supply the cryogenic fluid to the supply target 10 through the second section 122.

As the measurement result in step (S100), when the pressure of the first storage tank is less than the set pressure, the control unit opens the first valve 30 (S140) to introduce the cryogenic fluid into the build-up line 130 from the second section 122, and closes the second valve 310 (S150).

Referring to FIG. 4, the multiple storage tank system 1 determines whether the plurality of storage tanks 100 and 200 or the first storage tank 100 are charged with the cryogenic fluid (S200). As a determination result in the step (S200), when the plurality of storage tanks 100 and 200 or the first storage tank 100 are charged with the cryogenic fluid (S210), the control unit closes the third valve 32 to prevent the cryogenic fluid from flowing into the second section 122 of the supply line 120.

Additionally, when the plurality of storage tanks 100 and 200 or the first storage tank 100 are not charged with the cryogenic fluid, the control unit opens the third valve 32 (S230) to transfer the cryogenic fluid to the second section 122 of the supply line 120.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A multiple storage tank system comprising:
   a plurality of storage tanks in which a cryogenic fluid is stored;
   a plurality of discharge lines respectively connected to the plurality of storage tanks to discharge the stored cryogenic fluid or introduce a cryogenic fluid;
   a supply line connected to the plurality of discharge lines and a supply target to supply the cryogenic fluid discharged from the plurality of discharge lines to the supply target;
   a build-up line branching off at a predetermined position of the supply line to control internal pressure of a first storage tank of the plurality of storage tanks, the build-up line having one end branching off from a first point and the other end connected to the supply line at a second point after a portion of the build-up line passes the cryogenic fluid in the first storage tank;
   a gas transfer line connected to the plurality of storage tanks to transfer gas inside the plurality of storage tanks;
   a first heat exchanger formed at a position in front of the first point where the build-up line branches off from the supply line; and
   a second heat exchanger formed at the second point before the other end of the build-up line is connected to the supply line,
   wherein when the internal pressure of the first storage tank is controlled while the cryogenic fluid passes through the build-up line, gas inside the first storage tank is transferred to at least one other storage tank of the plurality of storage tanks through the gas transfer line so that internal pressure of the at least one other storage tank is also controlled.

2. The multiple storage tank system according to claim 1, further comprising:
   a first valve provided in the build-up line after the first point to selectively move the cryogenic fluid to the supply line or the build-up line; and
   a second valve formed at a position in front of the second point after the first point in the supply line,
   wherein the first valve is opened and the second valve is closed so that the cryogenic fluid passes through the build-up line when the internal pressure of the storage tank is less than preset pressure, or the first valve is closed and the second valve is opened so that the cryogenic fluid passes through the supply line when the internal pressure of the storage tank exceeds the preset pressure.

3. A multiple storage tank system comprising:
a plurality of storage tanks in which a cryogenic fluid is stored;
a plurality of discharge lines respectively connected to the plurality of storage tanks to discharge the stored cryogenic fluid or introduce a cryogenic fluid;
a supply line connected to the plurality of discharge lines and a supply target to supply the cryogenic fluid discharged from the plurality of discharge lines to the supply target;
a build-up line branching off at a predetermined position of the supply line to control internal pressure of a first storage tank of the plurality of storage tanks;
a gas transfer line connected to the plurality of storage tanks to transfer gas inside the plurality of storage tanks;
a charging line for charging a first storage tank among the plurality of storage tanks with the cryogenic fluid; and
a third valve formed at a predetermined position of the supply line,
wherein when the internal pressure of the first storage tank is controlled while the cryogenic fluid passes through the build-up line, gas inside the first storage tank is transferred to at least one other storage tank of the plurality of storage tanks through the gas transfer line so that internal pressure of the at least one other storage tank is also controlled,
wherein the supply line comprises a first section connecting the discharge lines on the basis of the third valve and a second section connected from the first section to the supply target, and
wherein when the first storage tank is charged with the cryogenic fluid through the charging line, the third valve is closed so that the cryogenic fluid discharged through the discharge line formed in the first storage tank is transferred only in the first section and the other storage tanks are also charged through the other discharge lines connected to the first section.

4. A multiple storage tank system comprising:
a plurality of storage tanks in which a cryogenic fluid is stored;
a plurality of discharge lines respectively connected to the plurality of storage tanks to discharge the stored cryogenic fluid or introduce a cryogenic fluid;
a supply line connected to the plurality of discharge lines and a supply target to supply the cryogenic fluid discharged from the plurality of discharge lines to the supply target;
a charging line connected to a first storage tank of the plurality of storage tanks to charge the first storage tank with the cryogenic fluid; and
a valve formed on the supply line,
wherein the supply line comprises a first section connecting the discharge lines on the basis of the valve and a second section connected from the first section to the supply target, and
wherein when the first storage tank is charged with the cryogenic fluid through the charging line, the valve is closed so that the cryogenic fluid discharged through a first discharge line formed in the first storage tank is transferred only in the first section and at least one other storage tank of the plurality of storage tanks are also charged through the other discharge lines connected to the first section.

5. The multiple storage tank system of claim 4, further comprising:
a gas transfer line connected to the plurality of storage tanks to transfer gas inside the plurality of storage tanks,
wherein when internal pressure of the first storage tank is controlled, gas inside the first storage tanks is transferred to all other storage tanks through the gas transfer line so that internal pressure of the other storage tanks is also controlled.

6. The multiple storage tank system according to claim 5, wherein the valve comprises:
a first valve provided in a build-up line after the first point to selectively move the cryogenic fluid to the supply line or the build-up line; and
a second valve formed at a position in front of the second point after the first point in the supply line,
wherein the first valve is opened and the second valve is closed so that the cryogenic fluid passes through the build-up line when the internal pressure of the storage tank is less than preset pressure, or the first valve is closed and the second valve is opened so that the cryogenic fluid passes through the supply line when the internal pressure of the storage tank exceeds the preset pressure.

* * * * *